Aug. 15, 1944.  R. W. JOHNSON  2,355,870
OIL CONTROL DEVICE
Filed April 26, 1941  3 Sheets-Sheet 1
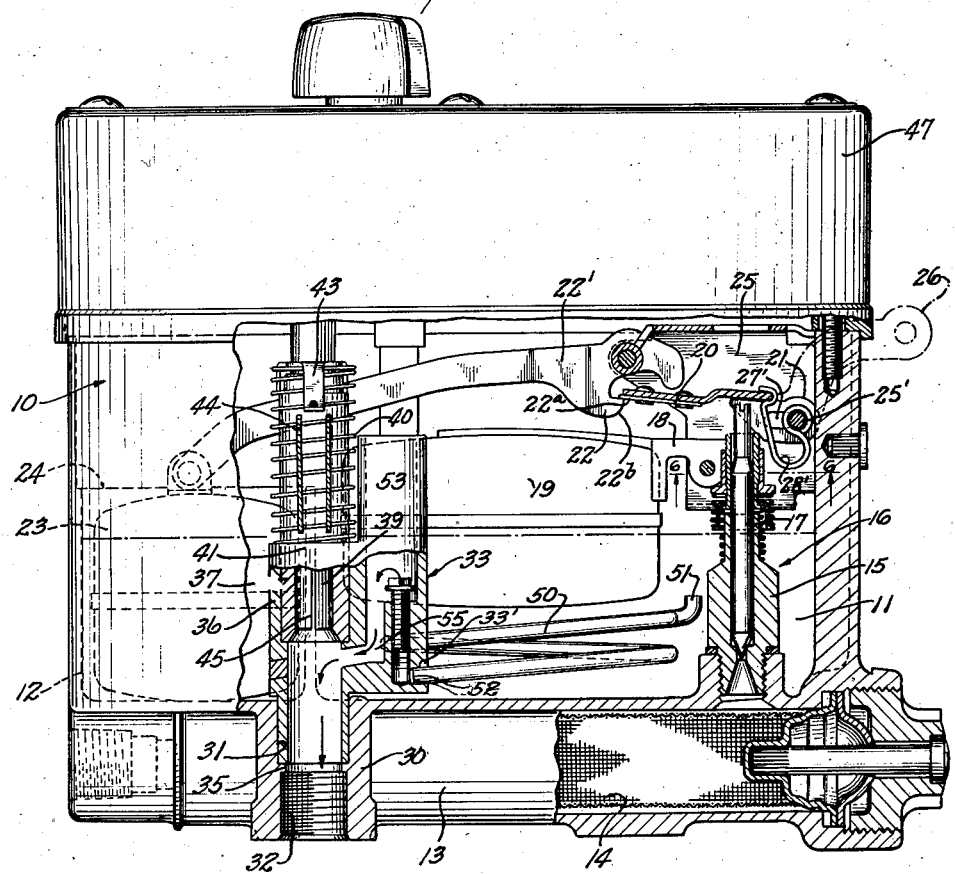
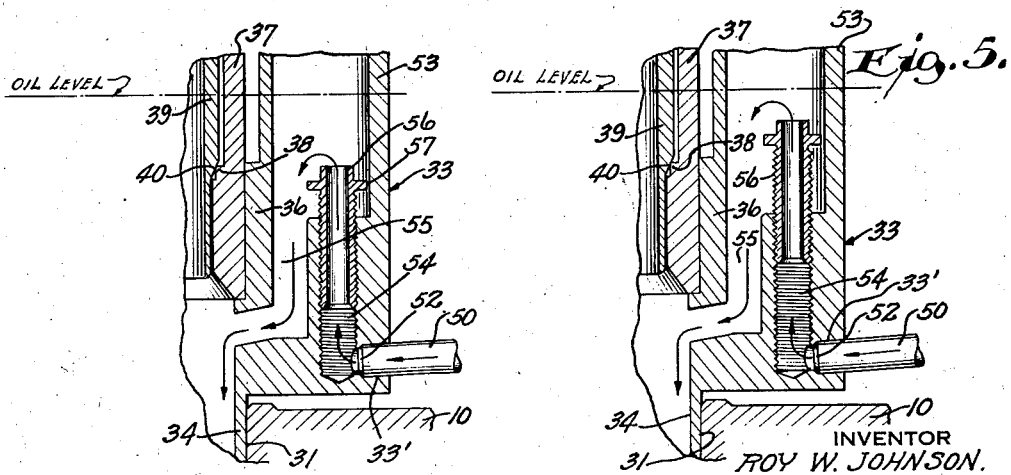
INVENTOR
ROY W. JOHNSON.
BY John W. Michael
ATTORNEY.

Aug. 15, 1944.　　　R. W. JOHNSON　　　2,355,870
OIL CONTROL DEVICE
Filed April 26, 1941　　　3 Sheets-Sheet 2

INVENTOR
ROY W. JOHNSON
BY John W. Michael
ATTORNEY.

Aug. 15, 1944.    R. W. JOHNSON    2,355,870
OIL CONTROL DEVICE
Filed April 26, 1941    3 Sheets-Sheet 3

INVENTOR.
ROY W. JOHNSON.
BY
ATTORNEY.

Patented Aug. 15, 1944

2,355,870

UNITED STATES PATENT OFFICE 2,355,870

OIL CONTROL DEVICE

Roy W. Johnson, Milwaukee, Wis.

Application April 26, 1941, Serial No. 390,463

11 Claims. (Cl. 137—68)

This invention relates to an improvement in oil control devices of the type incorporated in the fuel line between a reservoir and a burner in installations where the liquid fuel is fed by gravity to the burner.

Devices of this character usually comprise a casing having a liquid supply chamber provided with a fuel inlet, the latter being connected up to the reservoir. A float-controlled valve regulates the flow of the liquid fuel in through the inlet to maintain a constant level in the liquid supply chamber. Some suitable form of safety shut-off mechanism is also combined with the inlet valve normally for the purpose of preventing flooding of the burner in case of failure of the main float to so control the inlet valve as to maintain the predetermined level of the liquid fuel in the supply chamber. The liquid supply chamber is provided with one or more outlets which are connected up to the burner. Some form of metering valve arrangement, including a movable valve element shifted toward and away from its valve seat under the influence of either manually or thermostatically controlled means, is also usually employed to regulate the flow of oil or liquid fuel through the outlet to the burner.

The present invention proposes to utilize a capillary tube of suitable dimensions and proportions, and combined in a special way with the liquid supply chamber and the outlet passage to the burner, to regulate the flow of liquid fuel to the burner during the pilot cycle, that is, during those periods when a low or pilot flame is required at the burner. The inlet end of the capillary tube is submerged in the liquid in the supply chamber and the outlet end thereof is in open communication with the outlet passage.

The capillary tube so restricts the flow of the oil or liquid fuel from the supply chamber to the outlet passage as to obtain a precision metering of the oil flow during each pilot cycle.

Usually it is desirable to provide for some variation in the rate of flow as predetermined by the capillary tube to compensate for changes in temperature and in oil viscosity, and the present invention proposes to accomplish this by means of a vertically adjustable outlet fitting at the outlet end of the capillary tube which is adjustable to vary the effective hydrostatic head on the capillary tube and thereby appropriately vary the amount of liquid fuel that flows from the supply chamber to the outlet passage and consequently to the burner during each pilot cycle. The space or passage into which the liquid fuel discharges from the outlet fitting at the outlet end of the capillary tube is vented to the atmosphere at a point above the level of the liquid fuel in the liquid supply chamber.

The present invention also proposes to utilize a well-known type of metering valve arrangement including a valve seat and shiftable valve element to provide for increased flow of oil to the burner for high or intermediate fires or flames at the burner. The movable valve element of such a metering valve arrangement may be controlled in a variety of known ways, and it is essential only that the outlet end of the capillary tube communicates with the outlet passage on the outlet side of the valve seat of said metering valve arrangement.

Complete shut-off of flow of liquid fuel to the burner may be obtained by tripping the safety cut-off mechanism and thereby punching the inlet valve closed and shutting off the supply of liquid fuel to the liquid supply chamber. When this is done the liquid level in the supply chamber soon drops below the level of the outlet from the capillary tube and the burner is then extinguished.

Other objects and advantages reside in certain novel features of the construction, arrangement, and combination of parts, which will be hereinafter more fully described and particularly pointed out in the appended claims, reference being had to the accompanying drawings forming a part of this specification, and in which:

Figure 1 is a view partly in side elevation and partly in longitudinal, vertical cross section, showing an oil control device embodying the present invention;

Figures 4 and 5 are fragmentary views taken in the plane of line 4—4 of Figure 2 and illustrating respectively a low and high adjustment for the adjustable outlet of the capillary tube;

Figure 2:
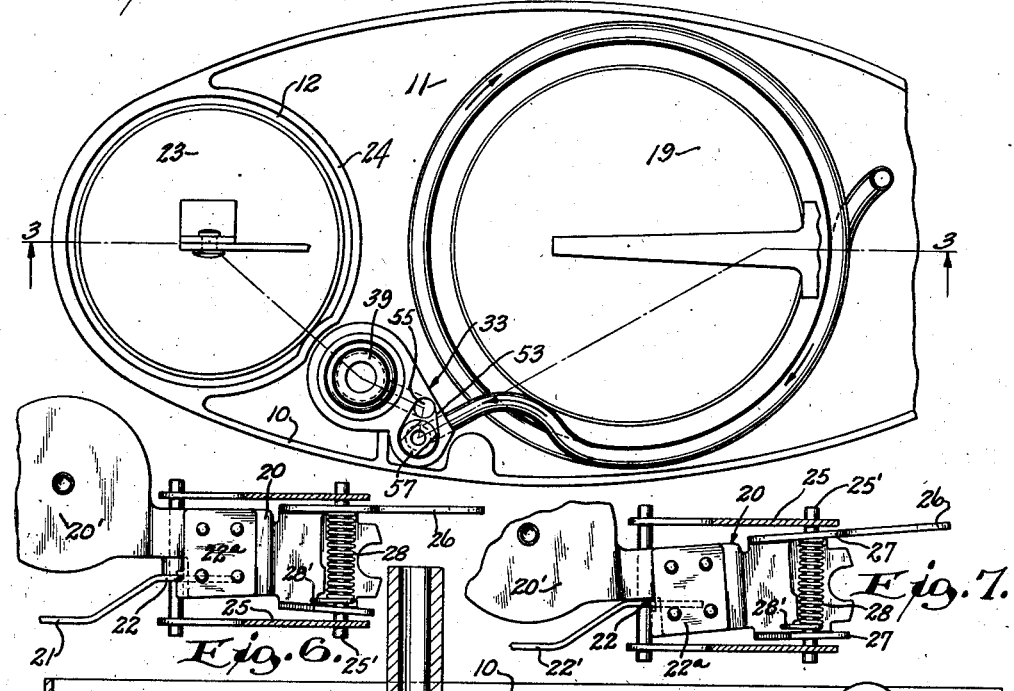
Figure 2 is a fragmentary view in top plan of the main casing of the control device; the control casing, elements of the means for maintaining a constant level in the liquid supply chamber of the main casing, and elements of the safety cut-off mechanism having been omitted for the sake of simplicity and clearness in illustration.

The two embodiments of the invention differ from each other only in the form of the capillary tube, in the particular manner in which the tube is combined with the outlet passage leading to the burner, and in the form or structure of the means provided to vary the rate of flow of fuel on the pilot cycle as primarily determined by the capillary tube. The two forms of the invention are otherwise substantially identical, and hence such features as the float-controlled inlet valve, the metering valve, and the safety cut-off mechanism, which are the same in both embodiments, are shown and described in detail only in connection with the embodiment illustrated in Figures 1 to 5. It is to be understood, however, that the disclosure of the details of these features in Figures 1 to 7 applies also to the embodiment of the invention shown in Figures 8 to 10 wherein such features are illustrated in a fragmentary or diagrammatic fashion to avoid unnecessary duplication.

Referring to the drawings, it will be seen that an oil control device embodying the present invention, in both of the forms thereof illustrated, comprises a main casing, designated generally at 10, and internally partitioned to provide a liquid supply chamber 11 and an overflow chamber 12. On the bottom of the main casing, which preferably is a die casting, an inlet 13 is provided and usually is equipped with a suitable strainer 14 (see Figure 1). The inlet communicates with the passage through the body 15 of an inlet valve, designated generally at 16, and having a valve proper 17 coacting with a seat provided on the inner wall of the passage-way through the valve body. The inlet valve 17 is operatively connected by means of a suitable lever 18 to a float 19 which is responsive to the level of the liquid fuel in the liquid supply chamber and so controls the inlet valve so as to maintain a constant liquid level therein.

Combined with the means for maintaining the constant level of liquid in the supply chamber is the safety cut-off means which includes an auxiliary valve operator 20 (see Figures 1, 6, and 7) weighted, as at 20', or otherwise suitably biased to punch the inlet valve 17 closed, but normally being restrained against action by means of a hook-like latch 22. The latch 22 is in turn controlled in its action by means of an over-flow or safety float 23 positioned in the over-flow chamber 12 and pivotally connected to the lever arm 22' of the latch. The arrangement is such that as long as the float-controlled inlet valve maintains a predetermined level in the liquid supply chamber, liquid fuel will not flow into the overflow chamber, but when the level rises above the predetermined or normal level a certain amount, then the liquid fuel flows over the internal partition or dam 24 separating the supply and overflow chambers to buoy up the float 23, release the latch 22, and allow the valve operator 20 to punch the inlet valve closed.

Figures 3, 6, 7:
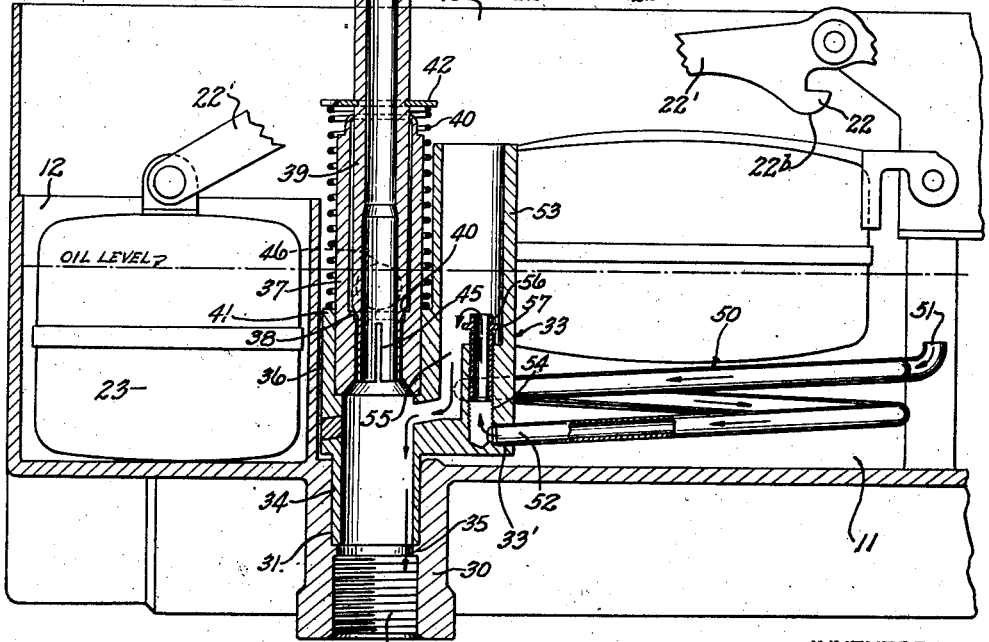
Figure 3 is a fragmentary view taken on line 3—3 of Figure 2, with parts omitted and parts broken away for the sake of illustration.
Figures 6 and 7 are detail views in bottom plan of elements of the safety cut-off mechanism and illustrating the structure thereof which provides for manual shut-off of the inlet valve.

The auxiliary valve-operating lever is pivotally supported by means of a pivot pin 25' on the same bracket structure 25 on which the latch 22 and its lever 22' are pivotally supported, and in order to provide for re-setting of the safety cutter mechanism after it has been tripped the auxiliary operator has a re-setting arm 26 integral therewith, or otherwise suitably fixed thereto, the re-setting arm projecting through a slot in the casing and having a portion disposed externally of the casing so as to be conveniently manipulatable. The auxiliary valve operator is fashioned from sheet metal, and it has depending pivot ears 27, one of which has a circular opening through which the pivot pin 25' extends and the other one of which is provided with an elongated slot 27'. A spring 28 is coiled about the portion of the pivot pin 25' located between the pivot ears 27, and it has one end anchored to the pin and its other end formed with an extended spring arm 28' which bears against a portion of the auxiliary valve operator, in the manner illustrated in Figure 1, to normally maintain the auxiliary valve-operating lever in the position shown in Figure 6, thereby disposing the latch plate 22a fixed to the operator in such relation to the hook-like latch 22 as to be in, or shiftably into, latching engagement therewith. This latching engagement is shown in Figure 1. The pivot ears are spaced from the adjacent members of the bracket 25, as illustrated in Figures 6 and 7. By so constituting the auxiliary valve-operating lever, it is practical to manually shut off the supply of fuel to the liquid level supply chamber. This may be accomplished by pressing laterally on the re-setting arm 26 to shift the valve operator laterally from the position shown in Figure 6 to the position shown in Figure 7, whereupon the latching projection of the latch plate 22a moves out of alinement and out of engagement with the hook-like latch 22 and allows the operator to manually depress the auxiliary valve operator and cause it to engage and punch the inlet valve 17 closed. Obviously, after the safety cut-off mechanism has either been manually or automatically tripped, it may be re-set by pressing down on the re-setting arm 26. When this is done the latching projection will wipe against the rounded nose 22b of the hook-like latch 22 to cause the hook-like latch 22 and its latch-lever 22b to rotate in a clockwise direction, as viewed in Figure 1, until the hook-like latch snaps under the latching projection of the latch-plate 22a.

The main casing 10 is provided with an outlet fitting 30 having an outlet passage 31 therethrough, the lower end of which is internally threaded, as at 32, to adapt it for connection with the pipe line or conduit leading to the burner.

In the embodiment of the invention shown in Figures 1 to 5, an adaptor, designated generally at 33, is provided, and has its lower portion formed with a bushing 34 which is fitted in the upper portion of the outlet passage 31 and provides in effect a continuation or part of the outlet passage. The lower end of this bushing-like structure 34 of the adaptor abuts against an internal annular shoulder 35 formed as an integral part of the structure in the casing which provides the outlet fitting 30. In vertical alinement with the bushing 34, and as an integral portion thereof, is a tubular valve guide support 36. The support 36 has a bore slightly larger than the bushing 34. The lower end of the tubular valve guide or housing 37 is fitted in the supporting structure 36 and extends to a point above the level of the liquid in the main supply chamber. This valve guide 37 has a valve seat 38 machined on its inner periphery. A tubular metering valve 39 is slidably interfitted with the valve guide or casing 37 and has a beveled face 40 which cooperates with the valve seat 38. In the construction illustrated, the metering valve 39 is biased to open position by a spring 40 having its lower end engaged with the fixed abutment 41 provided by the upper end of the supporting structure 36 and having its upper end engaged with the washer or abutment 42 suitably connected with the metering valve 39. The abutment 42 may have a tongue-like guide 43 combined therewith and co-acting with the guide ribs 44 provided on the interior of the main casing to constrain the metering valve to vertical sliding movement. The lower end of the metering valve is slotted, as at 45, to better enable it to perform its functions. The valve housing or guide 37 is provided with a lateral opening 46 affording communication between the liquid supply chamber and the interior of the valve guide above the seat 38.

Any suitable control instrumentality may be combined with the metering valve 39 to regulate its action. Its purpose is to vary the rate of flow of the liquid fuel from the liquid supply chamber to the outlet passage when the burner being served by the control device is operating at high or intermediate fires. As shown in Figure 1, such control instrumentalities, which may be manual or thermostatic, are housed in a control casing 47 which is superimposed on the main casing and is releasably secured thereto. As the details of the control instrumentalities form no part of the present invention they are not described or shown in detail.

When the burner served by the control is operating on low or pilot fire, that is when it is in the so-called pilot cycle, the metering valve 39 has its valve face engaged with the valve seat to completely shut off flow of the liquid fuel from the liquid supply chamber through the bore or opening 46 and past the valve seat 38 through the outlet passage 32.

The present invention provides for precision metering of the flow of fuel to the burner during the pilot cycle independently of the metering valve 39. In both forms of the invention flow of fuel to the burner during the pilot cycle is under the control of a capillary tube of predetermined dimensions and proportions (capillary tube 50 in Figures 1 to 5 and 50' in Figures 8 to 10). In general, the capillary tube (50 or 50') is a suitable length of metal tubing of restricted bore with its inlet end submerged in the liquid in the liquid supply chamber 11 and its outlet end appropriately connected with the outlet passage 31 on the outlet side of the metering valve structure 39.

To illustrate the dimensions and proportions of the capillary tube (50 or 50'), which incidentally are determined by experiment or empirically, one control device which has been used successfully employs a capillary tube 14 inches long and with an inside diameter of $92/1000$ of an inch, the inlet to the capillary tube being disposed one-half inch below the predetermined oil level in the liquid supply chamber, and the level of the discharge from the outlet end of the tube being raised or lowered to suit particular requirements in a manner which will be hereinafter more fully described. Preferably, also, the capillary tube is coiled to provide a compact structure which may be conveniently accommodated in a liquid supply chamber and disposed to surround and be in spaced relation to the float therein to afford the necessary clearances. It has also been found that the operation is improved if the convolutions of the coil are inclined with respect to the horizontal from its inlet end to the point where the tube communicates with its outlet fitting. It is immaterial whether the convolutions of the coil incline upwardly or downwardly from its inlet as in either arrangement entrapment of air bubbles and consequent air binding is prevented.

Referring now to Figures 1 to 5, it will be seen that in the embodiment of the invention therein illustrated the convolutions of the coiled capillary tube 50 incline downwardly from the tube inlet end 51 to its outlet end 52. The outlet end 52 of the tube 51 is fitted and secured in an opening 33' provided therefor in the adaptor 33. A stand pipe or vent pipe 53 is formed as an integral part of the adaptor 33 and is disposed to one side of the metering valve structure 39 and to one side and above the bushing 34 of the adaptor. The lower portion of the vent pipe 53 is thickened or enlarged and formed with a vertically disposed outlet passage 54 with which the opening 33', and consequently the outlet end 52 of capillary tube 50, freely communicates. The adaptor 33 is also formed with an intermediate passage 55 which provides for free communication between the tube outlet passage 54 and the control outlet passage 31, and this on the outlet side of the metering valve 39.

In order to provide for some variation in the rate of flow as predetermined by the capillary tube, and especially so in order to compensate for change in temperatures and oil viscosity, a vertical adjustable outlet tube or fitting 56 is combined with the capillary tube outlet passage 54 and may be simply threadedly interconnected therewith and provided with a collar 57 to facilitate its manipulation. For the sake of illustration, but not for restrictive purposes, it may be pointed out that one adjustable outlet tube that has been used to advantage has a range of adjustment wherein the effective hydrostatic head has been varied from three-eights of an inch to one-sixteenth of an inch.

Figure 9:
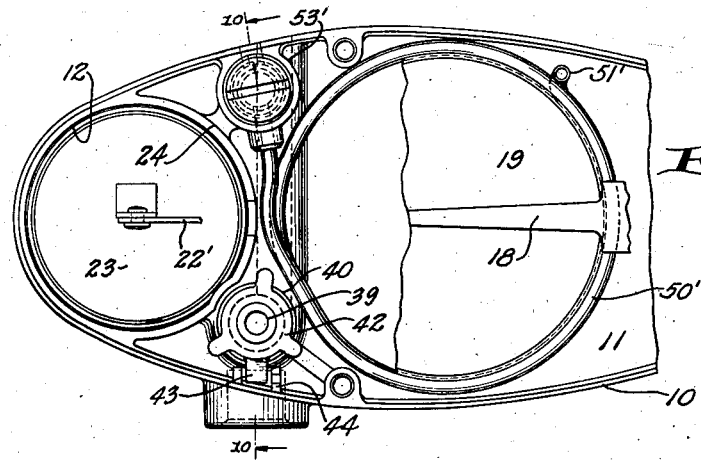
Figure 9 is a fragmentary view in top plan and similar to Figure 2, but further illustrating the modified form of the invention shown in Figure 8.
Figure 8:
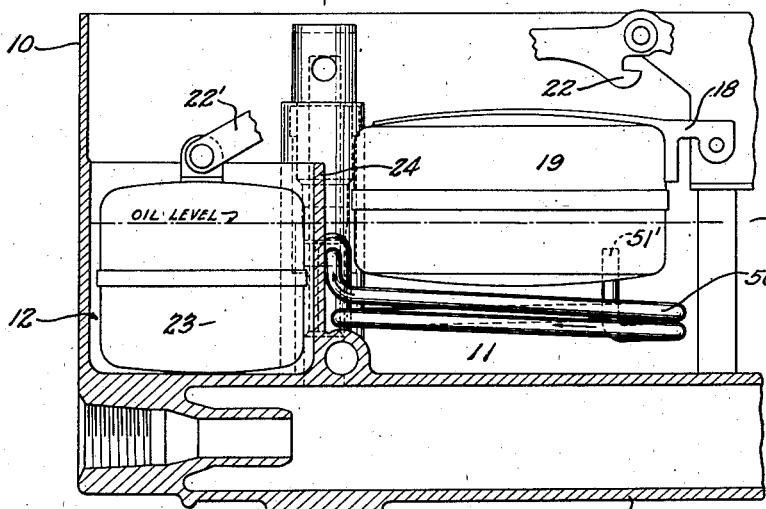
Figure 8 is a fragmentary view in longitudinal, vertical cross section of a modified form of the invention, with parts omitted, parts broken away, and parts shown in elevation for the sake of illustration.
Figure 10:
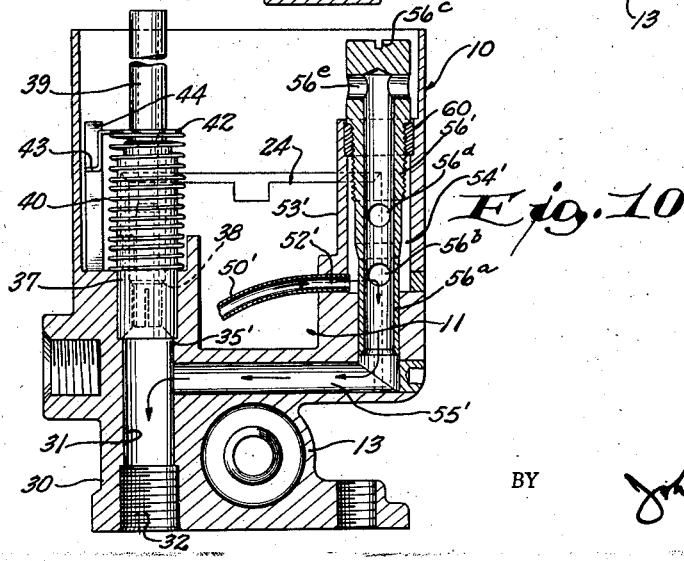
Figure 10 is a view in transverse, vertical cross section taken on line 10—10 of Figure 9, parts being omitted and parts being shown in elevation for the sake of simplicity in illustration.

Referring now to Figures 8 to 10, it will be seen that in the embodiment of the invention there illustrated the adaptor 33 is omitted. The valve guide 37 has its lower end press-fitted in the upper enlarged portion of the outlet passage 31, and is seated against an internal shoulder 35' provided therefor in the outlet passage 31. In other respects the metering valve 39 is constructed and operated as before. The stand pipe or vent pipe, designated at 53', and corresponding in function to the stand pipe or vent pipe 53, is in this form of the invention cast integral with the main casing 10 and is located on the opposite side of the casing from the metering valve 39.

In this form of the invention the convolutions of the coil capillary tube 50' incline upwardly from the tube inlet 51' to the tube outlet end 52'. The tube outlet end 52' is fitted and secured in an opening provided therefor in the stand pipe 53', and is in open communication with an outlet chamber or outlet passage 54' provided within the stand pipe. The outlet passage 54' connects or communicates with one end of a connecting passage 55' formed in and extending transversely of the bottom of the main casing 10 and opening directly into the outlet passage 31 on the outlet side of the metering valve 39. The flow of the liquid fuel from the outlet passage or chamber 54' to the passage 55' is under the control of an adjustable outlet tube or fitting, designated at 56', which, while differing in structure from the corresponding outlet tube or fitting 56 of the other embodiment of the invention, performs substantially the same function as the tube or fitting 56. The adjustable outlet or fitting 56' has its lower end portion 56a a close sliding fit in a correspondingly formed portion of the stand pipe 53', so that flow of the liquid fuel between this portion 56a and the portion of the stand pipe 53' in which it is fitted is prevented. The tube 56' is provided with a port 56b which is adjustably vertical to vary the rate of flow as predetermined primarily by the capillary tube. Vertical adjustment of the tube 56' is conveniently had by interthreading the upper portion of the tube 56' with a threaded bearing 69 provided therefor in the upper end of the stand pipe 53'. The upper end of the tube or fitting 56' may be closed and cross slotted, as at 56c, to facilitate its adjustment by means of a screw-driver or other suitable tool. The outlet passage 54' and the connecting passage 55' are vented by virtue of the provision of vent openings 56d and 56e in the adjustable tube or fitting 56'.

With the constructions described, precision metering is had over the supply of liquid fuel to the burner during the pilot cycle, but when conditions call for high or intermediate fires, the metering valve moves an appropriate distance away from its seat and the pilot flow is appropriately supplemented by the flow of the fuel passing from the liquid supply chamber passing through the valve. When it is desirable, or when the occasion arises to completely cut off the flow, the re-setting arm 26 is appropriately manipulated and the inlet valve 17 is punched closed. Then, when the level of the liquid fuel in the supply chamber 11 drops to a point at or below the upper end of the outlet tube 56, or the lower edge of the port 56b of outlet tube 56', flow of fuel to the burner will be completely shut off.

While I have shown and described several constructions in which the invention may be advantageously embodied, it is to be understood that the constructions shown have been selected merely for the purpose of illustration or example, and that various changes in the size, shape, or form and arrangement of the parts may be made while retaining the essential characteristics of the invention as indicated by the scope of the subjoined claims.

I claim:

1. An oil control device for use with gravity fed liquid fuel burners and comprising a casing having a liquid supply chamber provided with an outlet passage adapted to be connected to the burner and provided with a valve seat, a metering valve shiftable toward and away from said seat to vary the rate of flow of liquid fuel past said valve seat to said outlet passage, said valve being engageable with said seat to shut off flow from the liquid supply chamber past said valve seat to the outlet passage during the pilot cycle of the burner, and means for regulating the flow of liquid fuel through the outlet passage during the pilot cycle and comprising a capillary tube of suitable dimensions and proportions and having its inlet end submerged in the liquid in said liquid supply chamber and its outlet end in communication with said outlet passage on the outlet side of said valve seat.

2. An oil control device for use with gravity fed liquid fuel burners and comprising a casing having a liquid supply chamber provided with an outlet passage adapted to be connected to the burner, and means for regulating flow of liquid fuel through the outlet passage during the pilot cycle of the burner and comprising a capillary tube having its inlet end submerged in the liquid in said supply chamber and its outlet end in communication with the portion of the outlet passage which has unrestricted communication with the burner.

3. An oil control device for use with gravity fed liquid fuel burners and comprising a casing having a liquid supply chamber provided with an outlet passage adapted to be connected to the burner and provided with a valve seat, a metering valve shiftable toward and away from said seat to vary the rate of flow of liquid fuel past said valve seat to said outlet passage, said valve being engageable with said seat to shut off flow from the liquid supply chamber past said valve seat to the outlet passage during the pilot cycle of the burner, and means for regulating the flow of liquid fuel through the outlet passage during the pilot cycle and comprising a capillary tube of suitable dimensions and proportions and having its inlet end submerged in the liquid in said liquid supply chamber and a vertically adjustable outlet fitting combined with the outlet end of the tube and discharging into said outlet passage on the outlet side of said valve seat.

4. An oil control device for use with gravity fed liquid fuel burners and comprising a casing having a liquid supply chamber provided with an outlet adapted to be connected to the burner, and means for regulating flow of liquid fuel through the outlet during the pilot cycle of the burner and comprising a capillary tube having its inlet submerged in the liquid in said supply chamber and having its outlet in communication with the outlet of the chamber, the level of the outlet of the tube into the outlet of the chamber being a predetermined distance below the level of the liquid in said liquid supply chamber.

5. An oil control device for use with gravity fed liquid fuel burners and comprising a casing having a liquid supply chamber provided with an outlet adapted to be connected to the burner, means for regulating the flow of liquid fuel through the outlet during the pilot cycle of the burner and comprising a capillary tube having its inlet submerged in the liquid in said supply chamber and its outlet discharging into the outlet of the chamber, said tube being coiled and having the convolutions of its coil inclining from its inlet to its outlet.

6. An oil control device for use with gravity fed liquid fuel burners comprising a casing having a liquid supply chamber provided with an outlet, and means for regulating flow of liquid fuel through the outlet during the pilot cycle of a burner and comprising a capillary tube having its inlet submerged in the liquid in said supply chamber, and a vertically adjustable outlet tube in communication with the outlet end of the capillary tube and discharging into the outlet of said chamber.

7. An oil control device for use with gravity fed liquid fuel burners and comprising a liquid supply chamber provided with an outlet, means for regulating flow of liquid fuel through the outlet during the pilot cycle of the burner and comprising a capillary tube having its inlet submerged in the liquid in said supply chamber, an adaptor having a bushing fitted in the outlet of the chamber and having a vent pipe connected to and communicating with the bushing and open to the atmosphere above the level of liquid in said supply chamber, said adaptor having a vertical passage-way therein communicating with the interior of the vent pipe, said capillary tube having its outlet end connected to said last mentioned passage-way, and a vertically adjustable outlet tube interthreaded with said passage-way discharging into said vent pipe.

8. An oil control device for use with gravity fed liquid fuel burners and comprising a casing having a liquid supply chamber provided with an outlet, an adaptor comprising a bushing interfitted with said outlet, a valve support integrally and vertically alined with said bushing, and a vent pipe integral with and located to one side of said bushing and said support and communicating with the interior bushing, a valve guide mounted on said support, a metering valve coacting with said valve guide, means in said supply chamber to maintain a constant level of liquid fuel therein, and a capillary tube disposed in the liquid supply chamber having its inlet submerged in the liquid therein and its outlet connected to the adaptor and communicating with the interior of the vent pipe.

9. An oil control device for use with gravity fed liquid fuel burners and comprising a casing having a liquid supply chamber provided with an outlet passage adapted to be connected to the burner and having a valve seat therein, a metering valve cooperable with said seat to control flow of liquid therepast, said valve being engageable with said seat to shut off completely flow of liquid fuel past said valve seat during the pilot cycle of the burner, and means for regulating the flow of liquid fuel through the outlet passage during the pilot cycle and comprising a vertical vent pipe associated with said casing and having a passage leading therefrom to said outlet passage on the outlet side of said valve seat, and a capillary tube of suitable dimensions and proportions having its inlet end submerged in the liquid fuel in said supply chamber and having its outlet end connected to the vent pipe and communicating with the passage leading therefrom to said outlet passage.

10. An oil control device for use with gravity fed liquid fuel burners and comprising a casing having a liquid supply chamber provided with an outlet passage adapted to be connected to the burner and having a valve seat therein, a metering valve cooperable with said seat to control flow of liquid therepast, said valve being engageable with said seat to shut off completely flow of liquid fuel past said valve seat during the pilot cycle of the burner, and means for regulating the flow of liquid fuel through the outlet passage during the pilot cycle and comprising a vertical vent pipe associated with said casing and having a vertical outlet passage therein, there being a connecting passage extending from said outlet passage of the vent pipe to the outlet passage from the liquid supply chamber on the outlet side of said metering valve, a vertically adjustable outlet tube combined with the outlet passage of the vent pipe and controlling the level at which the outlet passage of the vent pipe communicates with said connecting passage, and a capillary tube having its inlet submerged in the liquid in the supply chamber and having its outlet connected with the outlet passage of the vent pipe.

11. An oil control device for use with gravity fed liquid fuel burners and comprising a casing having a liquid supply chamber provided with an outlet passage adapted to be connected to the burner and having a valve seat therein, a metering valve cooperable with said seat to control flow of liquid therepast, said valve being engageable with said seat to shut off completely flow of liquid fuel past said valve seat during the pilot cycle of the burner, and means for regulating the flow of liquid fuel through the outlet passage during the pilot cycle and comprising a vertical vent pipe associated with said casing and having a vertical outlet passage therein, there being a connecting passage extending from said outlet passage of the vent pipe to the outlet passage from the liquid supply chamber on the outlet side of said metering valve, a vertically adjustable outlet tube combined with the outlet passage of the vent pipe, said tube having a transverse opening intermediate its ends for controlling the level at which the outlet passage of the vent pipe communicates with said connecting passage, and a capillary tube having its inlet submerged in the liquid in the supply chamber and having its outlet connected with the outlet passage of the vent pipe, said vertically adjustable outlet tube being threadedly interconnected with the upper end of the vent pipe and having vent openings therein for venting the outlet passage of the vent pipe and also venting the vertically adjustable outlet tube itself.

ROY W. JOHNSON.